US006383531B1

(12) United States Patent
Gottemoller et al.

(10) Patent No.: US 6,383,531 B1
(45) Date of Patent: May 7, 2002

(54) SOY EXTENDED CHEESE

(75) Inventors: Thomas Gottemoller; Lewis True, both of Mt. Zion, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

(21) Appl. No.: 09/693,950

(22) Filed: Oct. 23, 2000

Related U.S. Application Data

(63) Continuation of application No. 09/408,075, filed on Sep. 29, 1999.

(51) Int. Cl.$^7$ ................................................ A23L 1/20
(52) U.S. Cl. .......................... 426/46; 426/44; 426/582; 426/634; 426/656
(58) Field of Search ..................... 426/582, 44, 46, 426/49, 52, 580, 615, 629, 634, 656

(56) References Cited

U.S. PATENT DOCUMENTS

| | | | |
|---|---|---|---|
| 2,604,405 A | 7/1952 | Peterson | 99/116 |
| 3,806,606 A | 4/1974 | Seiden | 426/188 |
| 3,941,891 A | 3/1976 | Kasik et al. | 426/94 |
| 4,080,477 A | 3/1978 | Tsumura et al. | 426/656 |
| 4,172,828 A | 10/1979 | Davidson et al. | 260/123.5 |
| 4,197,322 A | 4/1980 | Middleton | 426/36 |
| 4,346,122 A | 8/1982 | Orthoefer et al. | 426/656 |
| 4,349,576 A | 9/1982 | Lehnhardt et al. | 426/582 |
| 4,397,926 A | 8/1983 | Galal et al. | 426/582 |
| 4,435,438 A | 3/1984 | Lehnhardt et al. | 426/656 |
| 4,486,343 A | 12/1984 | Walker et al. | 260/112 G |
| 4,497,834 A | 2/1985 | Barta | 426/42 |
| 4,556,569 A | 12/1985 | Brander et al. | 426/104 |
| 4,608,265 A | 8/1986 | Zwiercan et al. | 426/582 |
| 4,678,676 A | 7/1987 | Ishizuka et al. | 426/573 |
| 4,684,533 A | 8/1987 | Kratochvil | 426/575 |
| 4,937,091 A | 6/1990 | Zallie et al. | 426/582 |
| 5,061,504 A | 10/1991 | Kong-Chan et al. | 426/582 |
| 5,064,660 A | 11/1991 | Silver | 426/36 |
| 5,676,984 A | 10/1997 | Bohanan et al. | 426/34 |
| 5,807,601 A | 9/1998 | Carpenter et al. | 426/578 |
| 5,902,625 A | 5/1999 | Barz et al. | 426/582 |
| 5,935,634 A | 8/1999 | Gamay et al. | 426/582 |
| 6,093,424 A | 7/2000 | Han et al. | 426/42 |
| 6,107,468 A | 8/2000 | Boatright | 530/378 |

FOREIGN PATENT DOCUMENTS

| | | |
|---|---|---|
| EP | 0 089 777 A2 | 9/1983 |
| EP | 0 711 504 A1 | 5/1996 |
| WO | 01/22829 A1 | 4/2001 |
| WO | 01/22830 A1 | 4/2001 |

OTHER PUBLICATIONS

English language translation of Russian Patent Publication No. SU 1 205 870 A.

English language abstract for Russian Patent Publication No. SU 1 205 870 A, Derwent World Patents Index Accession No. 1986–224540.

Pending Non–Provisional United States Patent Application No. 09/408,075, Gottemoller et al., filed Sep. 29, 1999.

Pending Non–Provisional United States Patent Application No. 09/408,074, Borders et al., filed Sep. 29, 1999.

Pending Non–Provisional United States Patent Application No. 09/674,711, Borders et al., filed Nov. 30, 2000.

Fox, P.F., *Cheese: Chemistry, Physics and Microbiology*, Chapman and Hall, p. 396 (1993).

Database FSTA Online, International Food Information Service (IFIS), English abstract of Smietana, Z., "Study of guided modification of milk proteins for processing purposes," *Zeszyty Naukowe Akademii Rolniczo Technicznej w Olsztynie, Technology Zywnosci* (14):123–184 (1979).

Database Online, International Food Information Service (IFIS), English abstract of Venkatachalam, N. et al., "Effect of soy protein isolate on rennet coagulation of milk and microstructure of cheese curd," IFT Annual Meeting Dept. of Nutrition and Food Science, Utah State University, p. 124 (1995).

Kosikowski, F.V. and Mistry, V.V., "Biology of a Ripening Cheese," in *Cheese and Fermented Milk Foods, vol. I, Origins and Principles*, F.V. Kosikowski, L.L.C., Westport, Connecticut, pp. 386–421 (1997).

Kosikowski, F.V. and Mistry, V.V., "Some Materials and Supply Sources," in *Cheese and Fermented Milk Foods, vol. 1, Origins and Principles*, F.V. Kosikowski, L.L.C., Westport, Connecticut, p. 698 (1997).

Del Valle, F.R. et al., "Simultaneous Curdling of Soy/Cow's Milk Blends with Rennet and Calcium or Magnesium Sulfate, Utilizing Soymilk Prepared from Soybeans or Full–Fat Soy Flour," *J. Food Sci.* 49:1046–1052, The Institute of Food Technologists, Chicago, IL (1984).

English language abstract for Russian Patent Publication No. SU 1 205 870 A, FSTA/IFIS Accession No. 87–1–02–v0159 FSTA.

English language abstract for Japanese Patent Publication No. JP 59–047585B, Derwent World Patents Index Accession No. 1979–72504B, Derwent World Patents Index Accession No. 1979–72504B.

English language abstract for Russian Patent Publication No. SU 1 785 421 A3, Derwent World Patents Index Accession No. 1994–032781.

*Primary Examiner*—Leslie Wong
(74) *Attorney, Agent, or Firm*—Sterne, Kessler, Goldstein & Fox

(57) ABSTRACT

The present invention relates, in general, to a process for the production of fresh soy cheese. The present invention further relates to a fresh soy cheese.

8 Claims, No Drawings

SOY EXTENDED CHEESE

CROSS REFERENCE TO RELATED APPLICATIONS

This application is a continuation of U.S. Appl. Ser. No. 09/408,075, filed Sep. 29, 1999, pending.

BACKGROUND OF THE INVENTION

1. Field of the Invention

The present invention relates, in general, to a process for the production of fresh cheese. The present invention further relates to a fresh cheese.

2. Background Information

The art of cheese making has been practiced for a number of years. The need to increase the amount of cheese from a given amount of milk is an economic necessity when the milk supply is limited, but the demand for such product is high. Soy protein has been used as an extender in cheeses with limited success. The patent literature is rich with patents which proclaim the ability to solve the various problems associated with using soy protein in a milk based fresh cheese. To date, none of the patents have described methods or products which have been commercial successes due to either the difficulty in incorporating the soy protein isolate into the finished cheese or because of the quality issues with the finished product.

SUMMARY OF THE INVENTION

The present invention provides a process for the production of fresh cheese comprising the following steps (a) mixing milk and isolated soy protein; (b) heating the mixture resulting from (a) to a temperature in the range of from about 70° C. to about 100° C.; (c) adding food grade acid to the mixture resulting from (b); and (d) separating the whey and the curd in the mixture resulting from (c).

DETAILED DESCRIPTION OF THE INVENTION

This invention relates to a process for the production of fresh cheese comprising (a) mixing milk and isolated soy protein; (b) heating the mixture resulting from (a) to a temperature in the range of from about 70° C. to about 100° C.; (c) adding food grade acid to the mixture resulting from (b); and (d) separating the whey and the curd in the mixture resulting from (c).

The milk used in the present invention can be present in amounts of from about 80% to about 100%, and preferable from about 90% to about 99.9%. The milk can comprise of from about 0% to about 5% fat. It can be desirable to use milk with a low fat content and optionally add fat from other sources. As such, the fat contained in the milk can originate from at least one of the compounds of the group comprising milkfat or vegetable oil.

The invention provides the above and below described methods wherein said soy protein is present in amounts of from about 10% to about 100% by weight, and preferably from about 15% to about 50%. By "percent" it is meant weight percent based on the calculated amount of casein solids in the milk. The isolated soy protein used in the present invention can be prepared by pH adjusting soy curd prior to spray drying or by blending different isolated soy proteins to obtain the desired pH. The pH of the isolated soy protein(s) can be of from about 3 to about 7, and preferably of from about 4.5 to about 6.5. The isolated soy protein can be less or greater than ambient temperature before addition to the milk. Preferably, the soy protein is at a temperature of about 0° C. to about 60° C., and even more preferably at a temperature of from about 30° C. to about 40° C.

After mixing the milk and isolated soy protein and heating this mixture to a temperature in the range of from about 70° C. to about 100° C., a food grade acid is added to the mixture to coagulate the mixture. In this way, the casein matrix encloses discrete agglomerates of soy protein isolate and provides a cheese with the desired texture and flavor. The food grade acid used in the present invention can be selected from the group comprising organic and non-organic acids used alone or in combination. Preferably the organic and non-organic acids are selected from the group comprising acetic acid, malic acid, citric acid, hydrochloric acid, phosphoric acid and lactic acid. Other such acids will be apparent to one of skill in the art. The invention provides the process of making the above and below described cheeses wherein said acid is present in amounts of about 0.05% to about 5.0% and preferably from about 0.1% to about 2.5%.

In one embodiment, the present invention provides a method of making a cheese analog by adding at least one compound to a mixture of soy protein and milk, wherein said compound is selected from the group comprising a whitening agent.

Often it is desirable to produce a cheese with a white appearance. As such, the present invention provides for the optional addition of a whitening agent in amounts of from about 0.005% to about 3% and preferably from about 0.01% to about 1.5%. The whitening agent must be chemically inert and harmless to the animal or human who ingests the agent, but, of course, also must make the appearance of the cheese white. The invention provides the herein described methods wherein said whitening agent can be selected from the group comprising titanium dioxide, titanium dioxide blend and titanium dioxide dispersions.

A mixture comprising curds and whey results after step (c), above. The whey can be separated from the remainder of the above and below described mixtures by at least one of the methods selected from the group comprising draining, straining and filtering. Preferably, said separation results in elimination of from about 20% to 99% and preferably from about 30% to about 90% of the whey.

After separating a percentage of the whey from the remainder of the above and below described mixtures, the mixture can optionally be placed in molds. The mixture in the molds can also optionally be pressed to remove more moisture from the cheese analog.

The taste of the cheese analog of the present invention can be enhanced by the addition of flavoring agents to the above and below described mixtures. The flavoring agents can be selected from the group comprising sodium chloride and natural and artificial flavors.

The present invention is described in further detail in the following non-limiting examples.

EXAMPLES

Example 1

A control fresh cheese was made without the use of soy protein isolate. The quantity of 3000 grams of whole milk was heated to 82° C. and held for 15 minutes under agitation. Diluted Lactic acid 8.8% (w/w) was added to the hot milk. The whey was then drained though a cheesecloth and the curd salted with 10 grams of sodium chloride, then placed in a mold for pressing. Of the 105 grams of protein in the milk, 90.09 grams were in 429.17 grams of cheese and 14.7 grams of protein in the recovered whey. The product had a good texture with a clean milky flavor.

Example 2

A fresh cheese was made with the use of soy protein isolate. To the quantity of 3000 grams of whole milk, 28 grams of a spray dried 5.4 pH soy protein isolate was added. The mixture was heated to 82° C. and held for 15 minutes under agitation. Diluted Lactic acid 8.8% (w/w) was added to the hot milk. The whey was then drained though a cheese-cloth and the curd salted with 10 grams of sodium chloride, then placed in a mold for pressing. Of the 129.64 grams of protein in the milk and soy protein isolate, 116.74 grams were in 589.6 grams of cheese and 12.8 grams of protein in the recovered whey. The product had a good texture with a clean milky flavor.

Example 3

A fresh cheese was made with the use of soy protein isolate. To the quantity of 3000 grams of whole milk, 28 grams of a blended soy protein isolated at pH of 5.4 was added. The mixture was heated to 82° C. and held for 15 minutes under agitation. Diluted Lactic acid 8.8% (W/w) was added to the hot milk. The whey was then drained though a cheesecloth and the curd salted with 10 grams of sodium chloride, then placed in a mold for pressing. Of the 129.64 grams of protein in the milk and soy protein isolate, 117.36 grams were in 553.6 grams of cheese and 11.6 grams of protein in the recovered whey. The product had a good texture with a clean milky flavor.

Example 4

A fresh cheese was made with the use of soy protein isolate. To the quantity of 3000 grams of whole milk, 42 grams of a pH 5.4 spray dried soy protein isolated was added. The mixture was heated to 82° C. and held for 15 minutes under agitation. Diluted Lactic acid 8.8% (w/w) was added to the hot milk. The whey was then drained though cheesecloth and the curd salted with 10 grams of sodium chloride, then placed in a mold for pressing. Of the 142 grams of protein in the milk and soy protein isolate, 125.43 grams were in 620 grams of cheese and 16.5 grams of protein in the recovered whey. The product had a good texture and a milky flavor with a slight whey flavor.

Example 5

A fresh cheese was made with the use of soy protein isolate. To the quantity of 3000 grams of whole milk, 83 grams of a pH 5.4 spray dried soy protein isolate was added. The mixture was heated to 82° C. and held for 15 minutes under agitation. Diluted Lactic acid 8.8% (w/w) was added to the hot milk. The whey was then drained though cheese-cloth and the curd salted with 10 grams of sodium chloride, then placed in a mold for pressing. Of the 178 grams of protein in the milk and soy protein isolate, 156.13 grams were in 680 grams of cheese and 21.9 grams of protein were in the recovered whey. The product had a good texture and a milky flavor with a slight so flavor.

Example 6

A flesh cheese was made with the use of soy protein isolate. To the quantity of 3000 grams of whole milk, 28 grams of a pH 4.5 spray dried soy protein isolate was added. The mixture w%as heated to 82° C. and held for 15 minutes under agitation. Diluted Lactic acid 8.8% (W/w) was added to the hot milk. The whey was then drained though cheesecloth and the curd salted with 10 grams of sodium chloride, then place, in a mold for pressing. Of the 129.64 grams of protein in the milk and soy protein isolate, 109 grams were in 560 grams of cheese and 20.6 grams of protein were in the recovered whey. The product had a good texture and a milky flavor with a slight acid flavor.

Example 7

A fresh cheese was made with the use of soy protein isolate. To the quantity of 3000 grams of whole milk, 28 grams of a pH 5.0 spray dried soy protein isolate was added. The mixture was heated to 82° C. and held for 15 minutes under agitation. Diluted Lactic acid 8.8% (w/w) was added to the hot milk. The whey was then drained though cheese-cloth and the curd salted with 10 grams of sodium chloride, then placed in a mold for pressing. Of the 129.64 grams of protein in the milk and soy protein isolate, 116.3 grams were in 580 grams of cheese and 13.3 grams of protein were in the recovered whey. The product had a good texture and a milky flavor with a very slight acid flavor.

All publications mentioned hereinabove are hereby incorporated in their entirety by reference.

While the foregoing invention has been described in some detail for purposes of clarity and understanding, it will be appreciated by one skilled in the art from a reading of this disclosure that various changes in form and detail can be made without departing from the true scope of the invention and appended claims.

What is claimed is:

1. A molded, pressed, fresh cheese composition prepared by a process comprising:
   a. mixing milk and isolated soy protein;
   b. heating the mixture resulting from (a) to a temperature between about 70° C. and about 100° C.;
   c. adding food grade acid to the mixture resulting from (b);
   d. separating the whey from the mixture resulting from (c);
   e. placing the product resulting from step d into molds; and
   f. pressing the molded product from step e.

2. A molded, pressed, fresh cheese composition comprising milk, food grade acid and isolated soy protein, wherein said isolated soy protein has a pH of from about 3 to about 7.

3. The molded, pressed, fresh cheese composition of claim 2, wherein said isolated soy protein is present in the amounts of from about 10% to about 100%.

4. The molded, pressed, fresh cheese composition of claim 2, wherein said milk is present in the amounts of from about 80% to about 100%.

5. The molded, pressed, fresh cheese composition of claim 2, wherein said milk comprises 0% to 5% fat.

6. The molded, pressed, fresh cheese composition of claim 2, wherein said fat is selected from the group consisting of milkfat and vegetable oil.

7. The molded, pressed, fresh cheese composition of claim 2, wherein said acid is present in the amounts of from about 0.05% to about 5%.

8. The molded, pressed, fresh cheese composition of claim 2, further comprising salt.

\* \* \* \* \*